CENTRIFUGAL CASTING APPARATUS AND PROCESS

Original Filed May 5, 1954 8 Sheets-Sheet 1

INVENTORS
JOHN A. LASATER &
THOMAS A. DEAKINS
By Hoyt, Lemaire & Bull
their ATTORNEYS

CENTRIFUGAL CASTING APPARATUS AND PROCESS

Original Filed May 5, 1954 8 Sheets-Sheet 2

INVENTORS
JOHN A. LASATER &
THOMAS A. DEAKINS
BY Hoppes, Leonard & Buell
their ATTORNEYS

CENTRIFUGAL CASTING APPARATUS AND PROCESS

Original Filed May 5, 1954 8 Sheets-Sheet 3

INVENTORS
JOHN A. LASATER &
THOMAS A. DEAKINS
BY Hoges, Fernald & Buell
their ATTORNEYS

CENTRIFUGAL CASTING APPARATUS AND PROCESS

Original Filed May 5, 1954 8 Sheets-Sheet 4

INVENTORS
JOHN A. LASATER &
THOMAS A. DEAKINS
BY Hoopes, Leonard & Buell
their ATTORNEYS

CENTRIFUGAL CASTING APPARATUS AND PROCESS

Original Filed May 5, 1954 8 Sheets-Sheet 5

INVENTORS
JOHN A. LASATER &
THOMAS A. DEAKINS
BY Hayes, Leonard & Buell
their ATTORNEYS

CENTRIFUGAL CASTING APPARATUS AND PROCESS

Original Filed May 5, 1954 8 Sheets-Sheet 6

INVENTORS
JOHN A. LASATER &
THOMAS A. DEAKINS
BY Hoopes, Leonard & Buell
Their ATTORNEYS

CENTRIFUGAL CASTING APPARATUS AND PROCESS

Original Filed May 5, 1954 8 Sheets-Sheet 7

INVENTORS
JOHN A. LASATER &
THOMAS A. DEAKINS
BY Hoppe, Leonard & Buell
their ATTORNEYS

CENTRIFUGAL CASTING APPARATUS AND PROCESS

Original Filed May 5, 1954 8 Sheets-Sheet 8

INVENTORS
JOHN A. LASATER &
THOMAS A. DEAKINS
BY Hayes, Leonard & Buell
their ATTORNEYS United States Patent Office Re. 24,827
Reissued May 17, 1960

24,827

CENTRIFUGAL CASTING APPARATUS AND PROCESS

John A. Lasater, Tyler, Tex., and Thomas A. Deakins, Chattanooga, Tenn., assignors to Herman Pneumatic Machine Company, Pittsburgh, Pa., a corporation of Pennsylvania Original No. 2,849,769, dated September 2, 1958, Serial No. 427,842, May 5, 1954. Application for reissue November 24, 1958, Serial No. 776,158

19 Claims. (Cl. 22—65)

Matter enclosed in heavy brackets [ ] appears in the original patent but forms no part of this reissue specification; matter printed in italics indicates the additions made by reissue.

This invention relates to a centrifugal casting apparatus and process. It relates to improvements in apparatus and processes such as are disclosed in United States Letters Patent Nos. 2,449,900, 2,559,161, and 2,613,410.

In processes of the type to which the invention relates finely divided mold forming material, such, for example, as sand, may be introduced into a rotary flask and consolidated against the interior surface of the flask to form a mold. Molten material to be cast, as, for example, molten metal such as iron, may be introduced into the flask with the mold therein while the flask is rotated at high speed to centrifuge the molten metal and form a hollow article, such, for example, as a length of pipe. The rotation of the flask is continued until the hollow article has solidified sufficiently to permit it to be removed from the flask whereupon the flask may be disposed in generally upright position and the hollow article removed downwardly therefrom.

A form of centrifugal casting apparatus of the type above referred to which has proved highly satisfactory in use and which is disclosed in United States Letters Patent No. 2,613,410 embodies four flasks arranged side by side in generally horizontal alignment. In the use of the apparatus of that patent mandrels are introduced into the flasks to compact or consolidate the finely divided mold forming material, the mandrels when in position in the flasks being supported at both ends and the mandrel supports at the respective ends of the mandrels being offset or moved transversely of the flasks while the flasks with the mold forming material therein rotate to consolidate the mold forming material. While excellent results have been obtained in the use of that apparatus we have found that by a different arrangement of parts we can effect the consolidating of the mold forming material in the flasks without offsetting the mandrels and by a simple angular movement of the flasks. The mechanism is simpler, easier to operate and less likely to require adjustment. In a preferred form of apparatus we utilize two flasks (although more than two may be incorporated if desired) mounted for rotation in a cradle. The cradle is in turn mounted in a cradle support which is carried by a stationary base for movement between a position in which the axes of the flasks are generally upright and a position in which the axes of the flasks are generally horizontal. The cradle is mounted for limited turning movement in the cradle support so that when the mandrels are introduced into the flasks the consolidating of the mold forming material in the flasks may be accomplished by the simple expedient of turning through a very small angle the cradle within the cradle support. Preferably the axes of the flasks are substantially equidistant from the axis of turning of the cradle in the cradle support.

Our apparatus is shown as designed for the casting of lengths of pipe having a bell or hub at one end and a spigot at the other end or having bells or hubs at both ends. To form a bell or hub in the centrifugal casting of lengths of pipe an enlargement is made in the mold at an end of the mold and a core is positioned within the enlargement to provide a space for the cast metal of greater diameter than the body of the pipe. We prefer to employ both a sand mold and a sand core. When the core is introduced into the enlargement in the end of the mold a shoulder on the core engages a complementary shoulder on the mold. It is important that the core be properly seated in the mold but it is equally important that in seating the core neither the mold nor the core be damaged. We provide for seating a core in a mold by the employment of resilient pressure so that the danger of damaging either the mold or the core is minimized.

In introducing a core into a mold the core is disposed upon a core holder which moves into cooperative relationship with the end of the mold to position the core therein. The core holder is rotatably mounted upon its supporting structure or core holder carrier so that it may remain in supporting relationship with respect to the core during casting when the mold and core rotate together. Since the core holder and the flask are separately mounted their axes may not be in exact alignment. To insure proper continued action of the core holder during the casting operation despite lack of exact coaxial relationship between the flasks and the core holder we preferably dispose resilient material between the core holder and the core which yields slightly during the casting operation and compensates for any lack of proper alignment of the flask and core holder.

It has been customary heretofore after preparing the mold and inserting the core or cores, when the molten material to be cast is to be introduced through a hollow core, as, for example, in the formation of double hub pipe, to insert through an opening provided in the core the outlet end of a pouring spout whereupon the molten material to be cast is introduced through the pouring spout while the flask and core rotate. We have simplified the apparatus and have provided for speeding up the operation by mounting our pouring spout unitarily with the core holder although providing for rotation of the core holder relatively to the pouring spout. We mount the pouring spout with its outlet end extending within or through the core holder. When a core is applied to the core holder the core, which has an opening therethrough receiving a portion of the core holder, not only surrounds that portion of the core holder but also surrounds the outlet end of the pouring spout which is disposed within the core holder. Thus the pouring spout is in effect automatically disposed in its operative position when the core is introduced into the end of the flask, obviating the separate manipulation of a pouring spout as heretofore.

When a mandrel is introduced into a flask to consolidate the mold forming material in the flask to form a mold the forward end of the mandrel is supported by a support provided adjacent the end of the flask opposite the end through which the mandrel is introduced. It has heretofore been proposed to mount the support for the forward end of the mandrel and a core holder, when double hub pipe is to be produced, on the same mounting member, provision being made for moving the mounting member to selectively present the mandrel support and the core holder to the end of the flask. We have explained above how we may mount the pouring spout together with the core holder. Thus in our preferred structure when double hub pipe is to be cast the mandrel support, core holder and pouring spout are all carried by the same mounting member. When single hub pipe is to be cast and no core is to be used at the end of the flask through which the molten material is to be introduced we mount the pouring spout upon the same mounting member as the mandrel support, facilitating the removal of the mandrel support and the introduction into the end of the flask of the outlet end of the pouring spout. This obviates the separate introduction of a pouring spout through an opening provided in the mounting member for the mandrel support as heretofore.

The mounting of the pouring spout as above described has the further advantage that the molten material ladle which is to supply the molten material to be cast may be mounted in a fixed location so that the only motion of which it need partake is a tilting motion to discharge the molten material. If the molten material ladle is a bottom pour ladle it need not partake of any bodily motion. Heretofore the molten material ladle has been arranged for bodily movement toward and from the flask into which it pours its contents.

We provide novel closure means for closing the lower end or ends of the flask or flasks when mold forming material is introduced downwardly thereinto at the beginning of the cycle. We provide in a multi-flask centrifugal casting apparatus a single mounting member or spider having a plurality of closure members thereon, the mounting member being disposed intermediate the flasks and being adapted to simultaneously apply closure members to the respective flasks in a multiflask apparatus. We also provide novel apparatus for first moving the closure members into alignment with the flasks and then moving them axially of the flasks into operative position. Our mechanism includes fewer parts than mechanisms previously provided for applying closure members to flasks and is relatively simple and inexpensive while at the same time being highly reliable in operation.

In a present preferred embodiment of our centrifugal casting apparatus we mount on a base a cradle having rotatably mounted therein an open-ended flask together with means for rotating the flask, the mounting of the cradle on the base being such that the cradle may be turned between a position in which the axis of the flask is generally upright and a position in which the axis of the flask is generally horizontal, and we provide a core holder carrier mounted on the base for turning movement in a generally vertical plane between a position substantially coaxial with the flask adjacent an open end of the flask when the flask is disposed with its axis generally horizontal and a position with the axis of the core holder carrier generally upright. We mount on the core holder carrier a core holder and means for moving the core holder into cooperative relationship with the flask when the core holder carrier is in the first mentioned position and the flask is disposed with its axis generally horizontal. The core holder carrier has therein an opening positioned when the core holder carrier is disposed with its axis generally upright to permit passage therethrough of a mandrel for consolidating finely divided mold forming material in the flask to form a mold. The mandrel is movable along a guide through said opening and into the flask when the flask is disposed with its axis generally horizontal. Means are provided for relatively transversely moving or offsetting the mandrel and flask when the mandrel is within the flask.

As explained above we show the means for relatively transversely moving or offsetting the mandrel and flask when the mandrel is within the flask as means for turning or swinging the flask through a small angle in a plane perpendicular to the axis of the mandrel and about a center spaced from the axis of the mandrel. That is one of the features of our improved centrifugal casting apparatus. However, other means for relatively transversely moving the mandrel and flask when the mandrel is within the flask and the flask is rotating to consolidate finely divided mold forming material in the flask to form a mold may be utilized in connection with other features of our apparatus. Indeed, the features which are described and shown have in many cases advantages when used individually although further advantages are realized when certain of the features are used in combination.

Other details, objects and advantages of the invention will become apparent as the following description of a present preferred embodiment of the invention and a present preferred method of practicing the same proceeds.

In the accompanying drawings we have shown a present preferred embodiment of the invention and have illustrated a present preferred method of practicing the same in which Figure 1 is a plan view, partly in horizontal cross section, of centrifugal casting apparatus having two flasks and cooperating elements, the flask and cooperating elements near the bottom of the figure being adapted for the casting of single hub pipe and the flask and cooperating elements nearer the top of the figure being adapted for the casting of double hub pipe;

Figure 6:
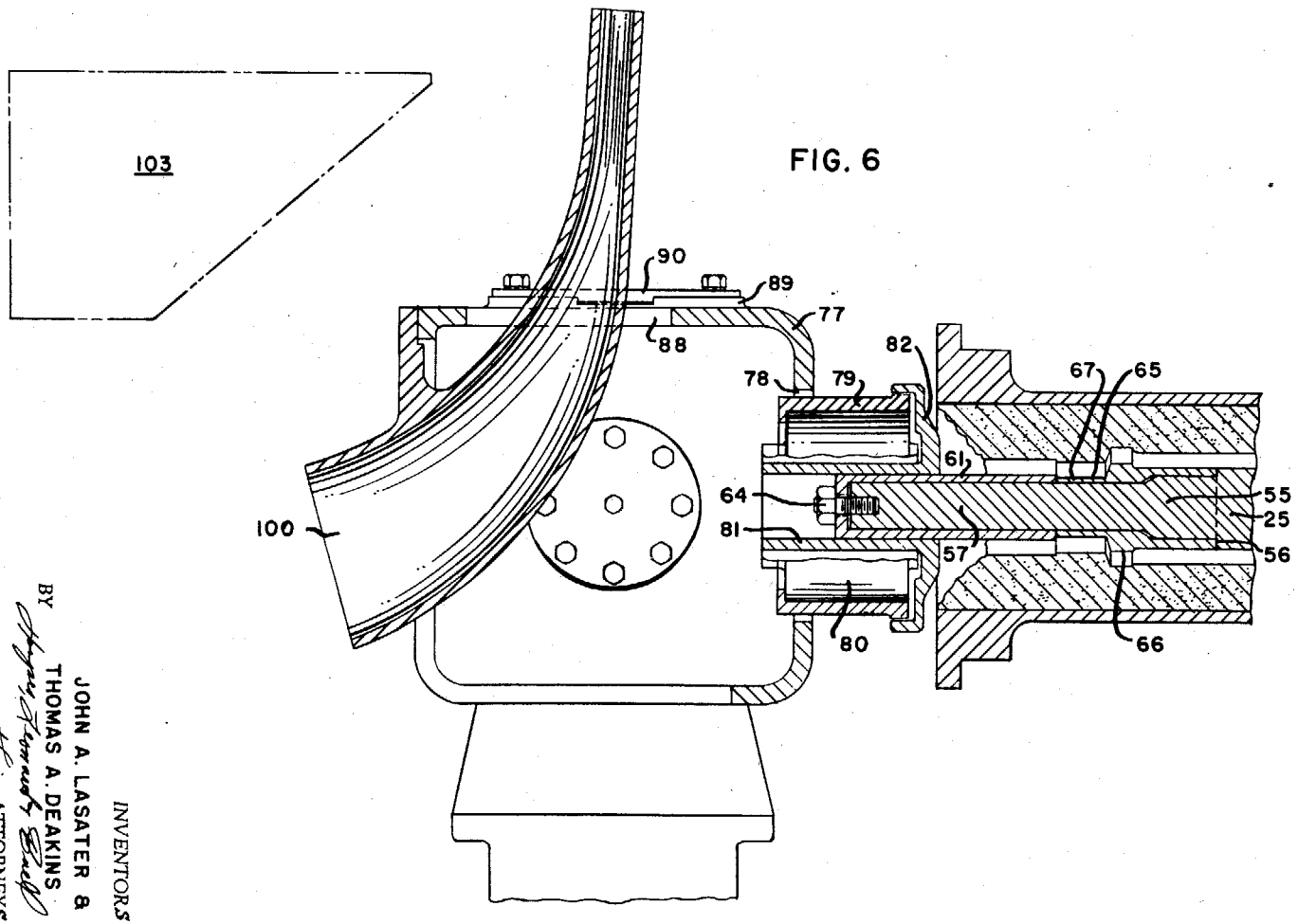
Figure 6 is a fragmentary detail view to enlarged scale in comparison with the scale of Figures 1 and 2 showing the support for the forward end of a mandrel and the corresponding pouring spout as adapted for the forming of single hub pipe, the support for the forward end of the mandrel being in operative mandrel-supporting position and the pouring spout being in inoperative position.
Figure 8:
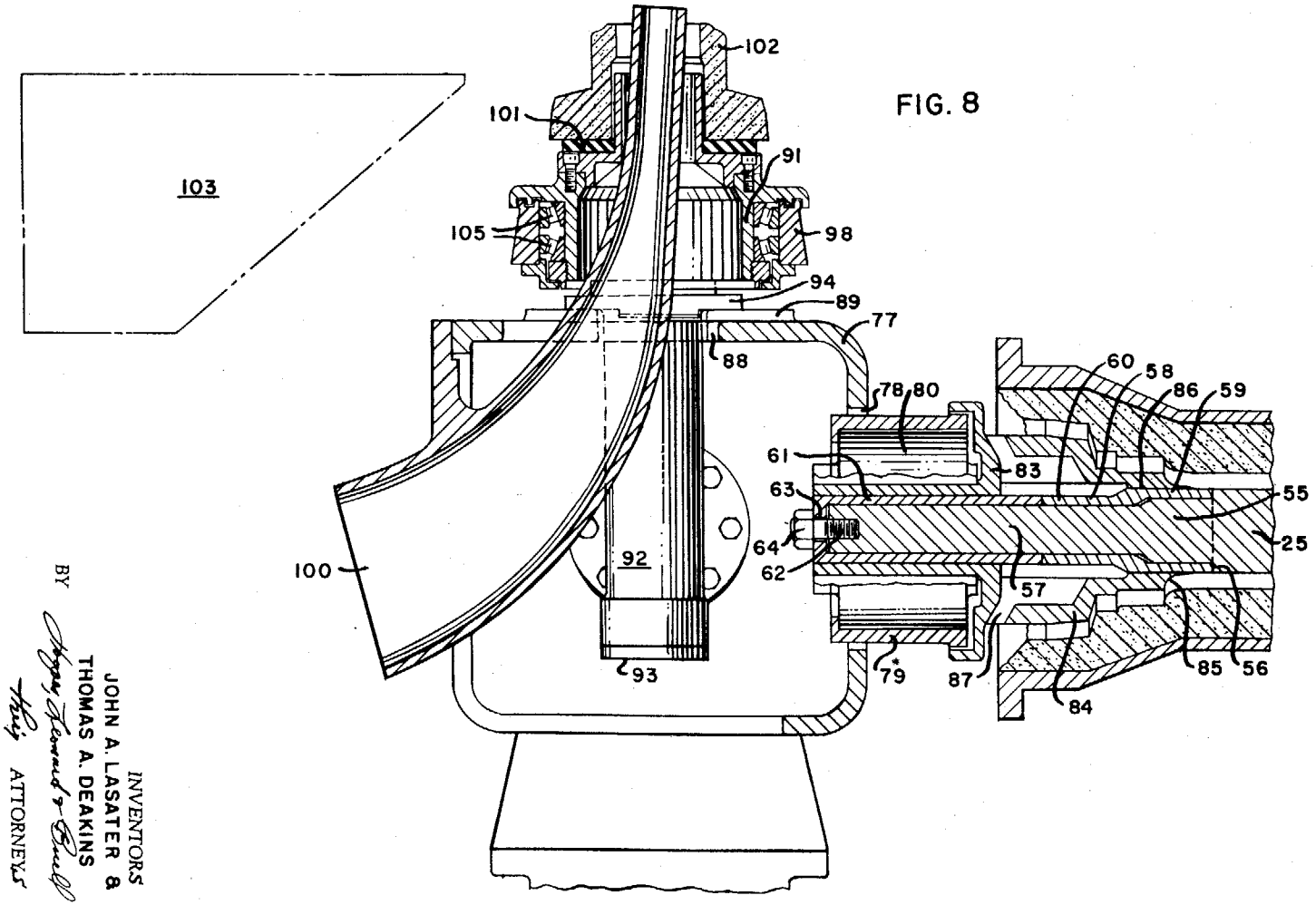
Figure 9:
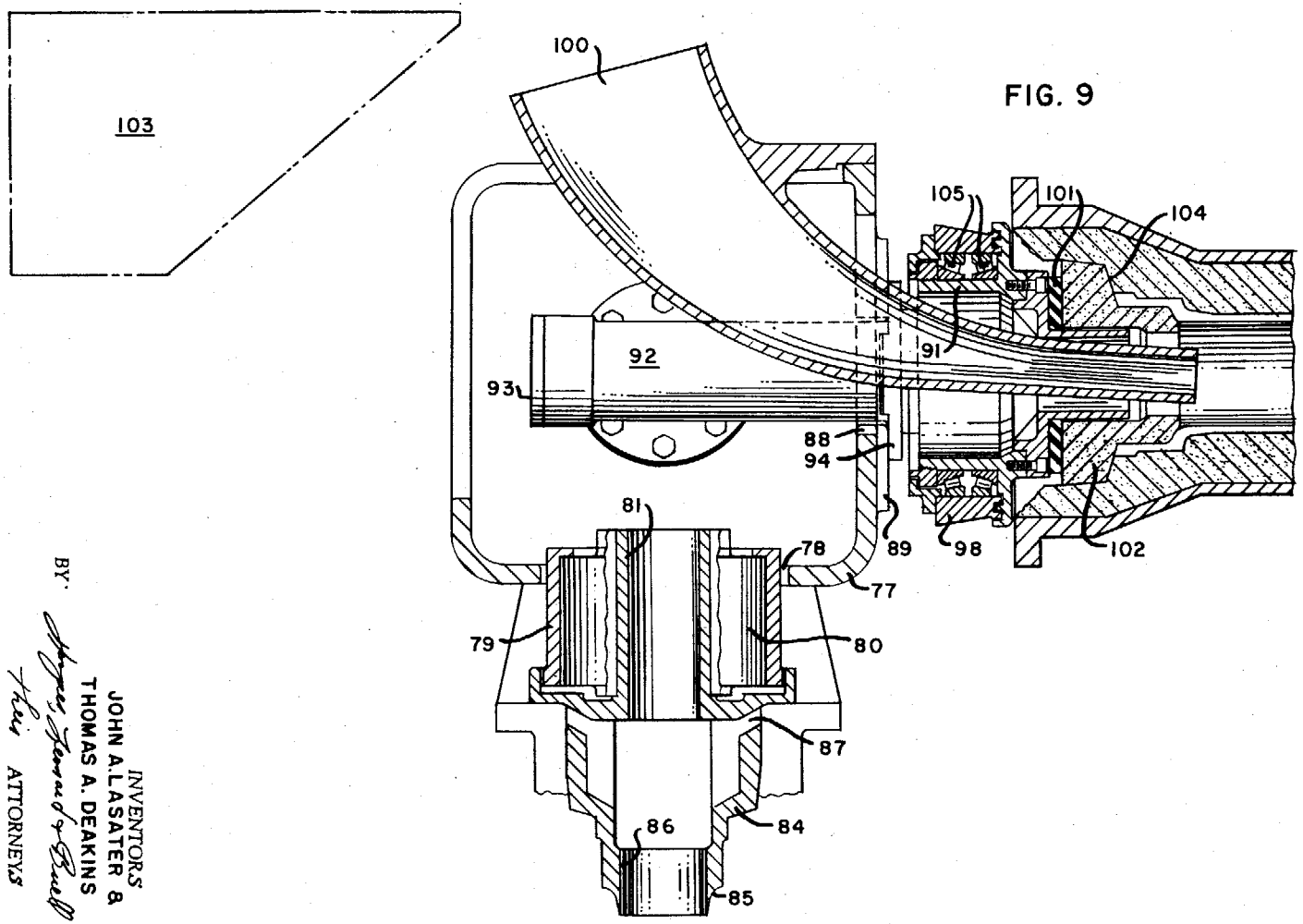

Figure 8 is a view similar to Figure 6 showing the support for the forward end of a mandrel provided with a hub cooperating with the mandrel for forming in the mold at the end thereof shown in the figure an enlarged portion for forming one of the hubs of double hub pipe and also showing the pouring spout and associated core holder as adapted for the forming of double hub pipe, the support for the forward end of the mandrel and the hub being in operative position and the pouring spout and associated core holder being in inoperative position; and Figure 9 is a view similar to Figure 8 of the same elements of the apparatus but with the pouring spout and associated core holder in operative position and the support for the forward end of the mandrel and the hub in inoperative position.

Figure 1:
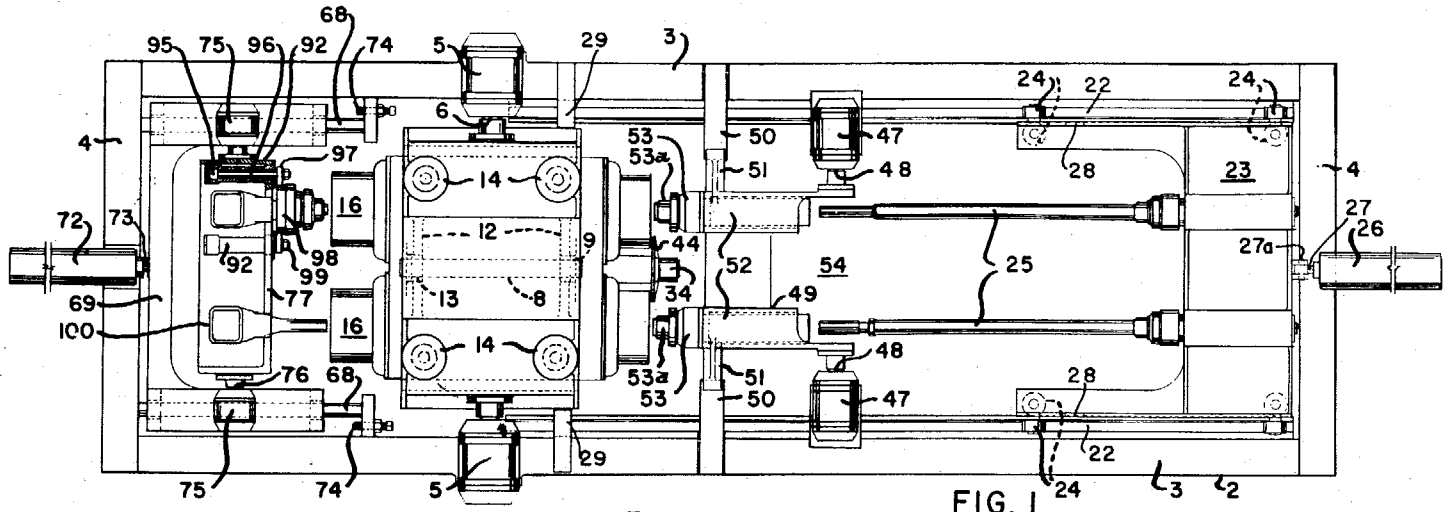
Figure 2:
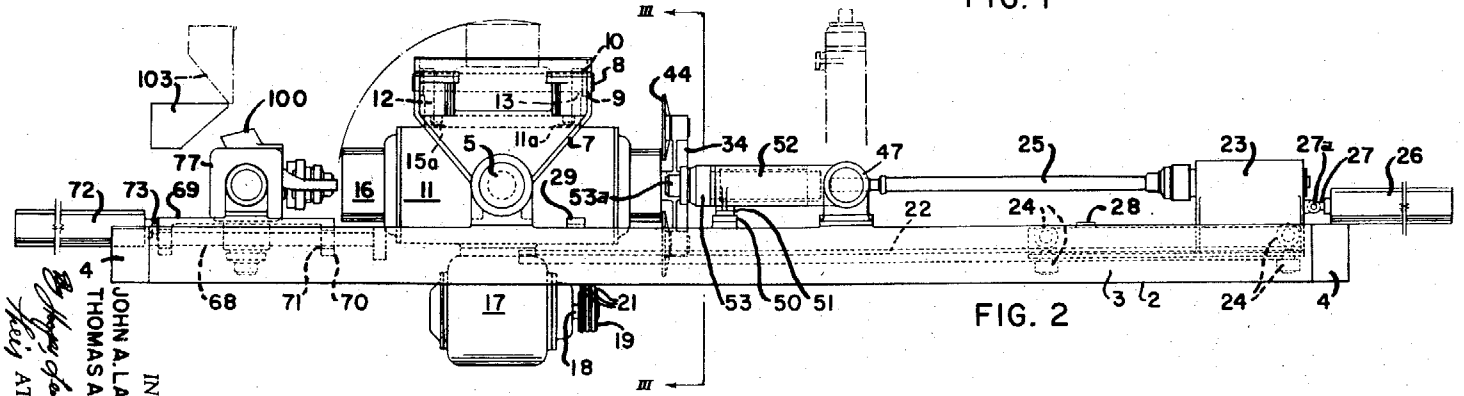
Figure 2 is an elevational view of the apparatus shown in Figure 1 and additionally showing diagrammatically a ladle for pouring molten material to be cast into the centrifugal casting apparatus and further showing in chain lines positions of certain of the parts different from the positions of those parts shown in full lines.
Figure 3:
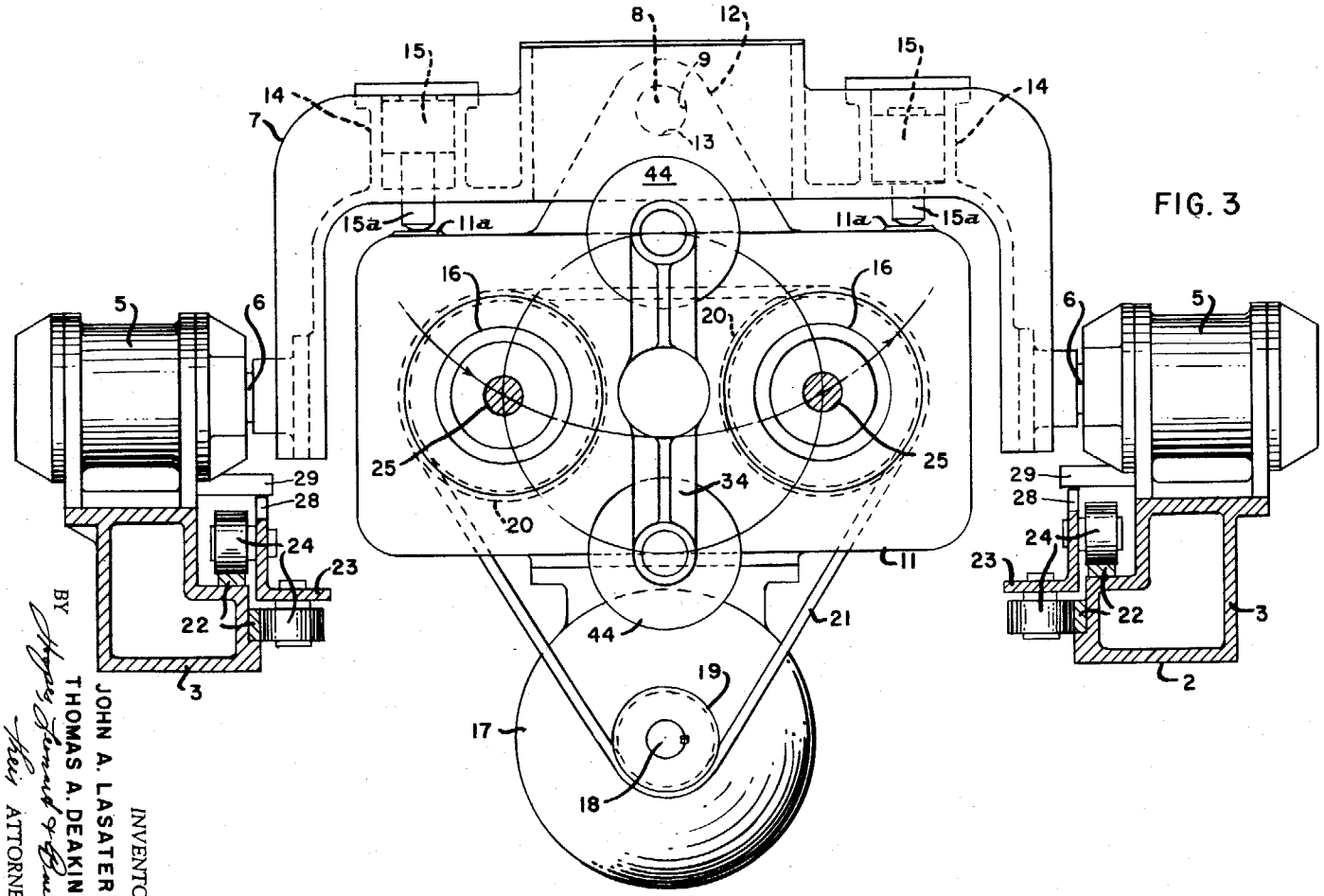
Figure 3 is a vertical transverse cross-sectional view taken on the line III—III of Figure 2 but with the core holder carriers and core holders moved to the chain line position of Figure 2 (and hence not shown at all in Figure 3) and the mandrels partially advanced.

Referring now more particularly to the drawings and first to Figures 1, 2 and 3, the centrifugal casting apparatus is mounted upon a fixed base designated generally by reference numeral 2. The fixed base 2 comprises opposed spaced apart elongated supporting portions 3 which are generally parallel and extend generally longitudinally of the apparatus. The supporting portions 3 are suitably connected together by transverse members such as shown at 4 in Figures 1 and 2.

Mounted on the respective supporting portions 3 in opposed spaced apart coaxial relationship are rotary cylinders 5 which may be of conventional construction having coaxial shafts 6 which are turned upon turning movement of the rotors of the rotary cylinders 5 in a manner known to those skilled in the art. Fastened to the opposed coaxial shafts 6 is a cradle support 7 of generally U-shape as shown in Figure 3, the cradle support 7 being carried by the shafts 6 adjacent the extremities of the legs of the U. The cradle support 7 is adapted to be turned by operation of the rotary cylinders 5 between a position in which it is disposed in a generally vertical plane as shown in Figure 3 and a position in which it is disposed in a generally horizontal plane; in other words, the cradle support is adapted to be turned about the common axis of the rotary cylinders 5 through an angle of approximately 90°. Suitable positioning means not shown in the drawings are provided for stopping and positioning the cradle support in each of its two positions.

The pivot pin 8 is mounted in the cradle support 7, having its ends extending through bores 9 in opposed upstanding rib portions 10 of the cradle support. Pivotally carried by the pivot pin 8 is a cradle 11. The cradle 11 has spaced apart lugs 12 respectively provided with bores 13 through which the pivot pin 8 passes to pivotally mount the cradle 11 on the cradle support 7. The cradle 11 is adapted to partake of limited turning movement about the axis of the pivot pin 8 for a purpose to be presently described. The turning movement of the cradle need be through only a few degrees but the limits of the turning movement should be accurately determinable. While various means may be provided for turning and stopping the turning movement of the cradle 11 in the respective directions about the axis of the pivot pin 8, we have shown largely diagrammatically simple means which will accomplish the purpose, such means being in the form of opposed cylinders 14 mounted in the cradle support 7, each of the cylinders 14 having a piston 15 operating therein, suitable connections (not shown) being provided for admitting fluid under pressure to the respective ends of the cylinders and conventional control means also being provided for controlling the flow of the fluid. Connected with each piston 15 and projecting out of the corresponding cylinder 14 into engagement with a pad 11a of the cradle 11 is a pin 15a as shown in Figure 3. The operative positions of the cradle 11 are determined by the engagement therewith of the pins 15a. In order to insure accuracy of movement and stopping of the cradle 11 we preferably provide two cylinders 14 each with a piston 15 operating therein and having a pin 15a protecting therefrom at each side of the pivot pin 8 as shown in Figure 1.

In the simplified construction shown in the drawings the turning movement of the cradle 11 in the clockwise direction about the axis of the pivot pin 8 viewing Figure 3 is stopped when the pistons 15 in the left-hand cylinders 14 viewing that figure engage the upper cylinder heads of their respective cylinders and the turning movement of the cradle 11 in the counterclockwise direction about the axis of the pivot pin 8 viewing Figure 3 is stopped when the pistons 15 in the right-hand cylinders 14 viewing that figure engage the upper cylinder heads of their respective cylinders. In Figure 3 the cradle 11 is shown in extreme position turned in the clockwise direction about the axis of the pivot pin 8. In that position the axes of the two flasks rotatably mounted in the cradle which will presently be described preferably lie substantially in a common horizontal plane when the cradle support 7 is disposed in a generally vertical plane as shown in Figure 3. When the cradle 11 is turned in the counterclockwise direction about the axis of the pivot pin 8 viewing Figure 3 the axes of the flasks move out of such common horizontal plane for a purpose which will be described.

Mounted for rotation in the cradle 11 are a plurality of flasks for the centrifugal casting of hollow elongated articles, such, for example, as lengths of pipe, and, by way of more specific example, lengths of cast iron soil pipe. It is to be understood, however, that elongated articles other than lengths of pipe may be centrifugally cast and materials other than iron may be employed. For example, other metals or non-metallic materials of suitable structural characteristics may be utilized.

We have shown two parallel flasks 16 each mounted for rotation in the cradle 11 although more than two flasks may be mounted in the cradle if desired. To avoid complexity of the drawings we have not shown in detail the structure for rotatably mounting the flasks. Such structure is now a matter of knowledge to those skilled in the art. The flasks may, for example, be mounted for rotation as shown in United States Letters Patent No. 2,449,900. Desirably the two flasks 16 are mounted in the cradle 11 with their axes equidistant from the axis of the pivot pin 8. Such mounting of the flasks insures uniform compacting therein of finely divided mold forming material as will presently be described. If more than two flasks are mounted in the cradle 11 it is preferable that the axes of all of the flasks be equidistant from the axis of the pivot pin 8, although under certain conditions it may be possible to deviate somewhat from that arrangement.

Means are provided for rotating the flasks 16 at centrifugal speed so as to form therein centrifugally cast hollow elongated articles. For rotating the flasks we show an electric motor 17 mounted upon the cradle 11 and carrying upon its shaft 18 a multiple V-belt pulley 19. Similar pulleys 20 are mounted upon the respective flasks 16 and V-belts 21 are trained about the respective pulleys 19 and 20 as shown in Figure 3. The pulleys 20 are preferably of equal diameter so that the two flasks 16 are turned at the same speed by the V-belts 21 when the motor 17 is operated.

It has been mentioned above that the cradle support 7 is movable between a position in a substantially horizontal plane and a position in a substantially vertical plane and that means are provided for stopping movement of the cradle support when it reaches the respective positions mentioned. When the cradle support is in a generally vertical plane as shown in Figure 3 the axes of the flasks 16 are generally horizontal and, as also mentioned above, when the cradle 11 is in its extreme clockwise position viewing Figure 3 while the cradle support is in a generally vertical plane the axes of the flasks are in a common horizontal plane. When the cradle support 7 is in a generally horizontal plane the axes of the flasks are generally vertical. The cradle support turns between a position in which the flasks 16 are generally horizontal as shown in full lines in Figure 2 and a position in which the left-hand ends of the flasks as shown in full lines in Figure 2 are disposed upwardly as shown in chain lines in that figure.

The opposed supporting portions 3 of the base 2 have parallel longitudinal tracks 22 shown in Figure 3. We provide a mandrel support 23 adapted for movement longitudinally of the apparatus guided and supported by the tracks 22. The mandrel support 23 has rollers 24 rotatably mounted thereon cooperating with the tracks 22 as shown in Figures 1 and 3 to insure accurately guided movement of the mandrel support 23 longitudinally of the apparatus. Rotatably mounted in the mandrel support 23 in a manner known to those skilled in the art are a plurality of mandrels 25 having their axes substantially parallel to each other, there being the same number of mandrels 25 as there are flasks rotatably mounted in the cradle 11 and the axes of the mandrels being arranged in the same pattern and with the same spacing as the axes of the flasks. Since there are two flasks in the apparatus shown in the drawings we have shown two mandrels. The axes of the two mandrels 25 are spaced apart the same distance as the axes of the flasks 16 are spaced apart. The axes of the mandrels 25 lie in parallel relationship in a common horizontal plane and remain in that plane at all times. The mandrels are mounted to be rotated by frictional engagement with the finely divided mold forming material used for forming molds in the flasks as will presently be described. The mandrels partake of only two motions, the rotative motion just mentioned and axial movement effected by movement of the mandrel support 23 along the rails 22. The mandrels 25 are respectively coaxial with the flasks 16 when the cradle support and cradle are in the position shown in Figures 1 and 3 and shown in full lines in Figure 2. When the mandrels are in coaxial relationship with the flasks and finely divided mold forming material has been introduced into the flasks and the flasks are rotated the mandrels are introduced into the flasks by advancing the mandrel support 23 from right to left viewing Figures 1 and 2. The mandrel support 23 is advanced by a piston in a cylinder 26, the cylinder being fixedly mounted on the base and the piston rod 27 being connected with the mandrel support 23 at 27a. Any suitable means as known to those skilled in the art may be provided for stopping the movement of the mandrel support 23 to introduce the mandrels into the flasks. Such means may be the cylinder head of the cylinder 26 or the means for supporting the forward ends of the mandrels presently to be described. The mandrel support 23 has at its opposite sides bosses 28 (Figure 2) which when the mandrels reach operative position within the flasks underlie cooperating lugs 29 carried by the base 2 to in effect clamp the mandrel support 23 to the base to resist the tendency to lift the mandrel support from the rails or turn the mandrel support during compacting of the mold forming material in the flasks as will presently be described.

Figure 4:
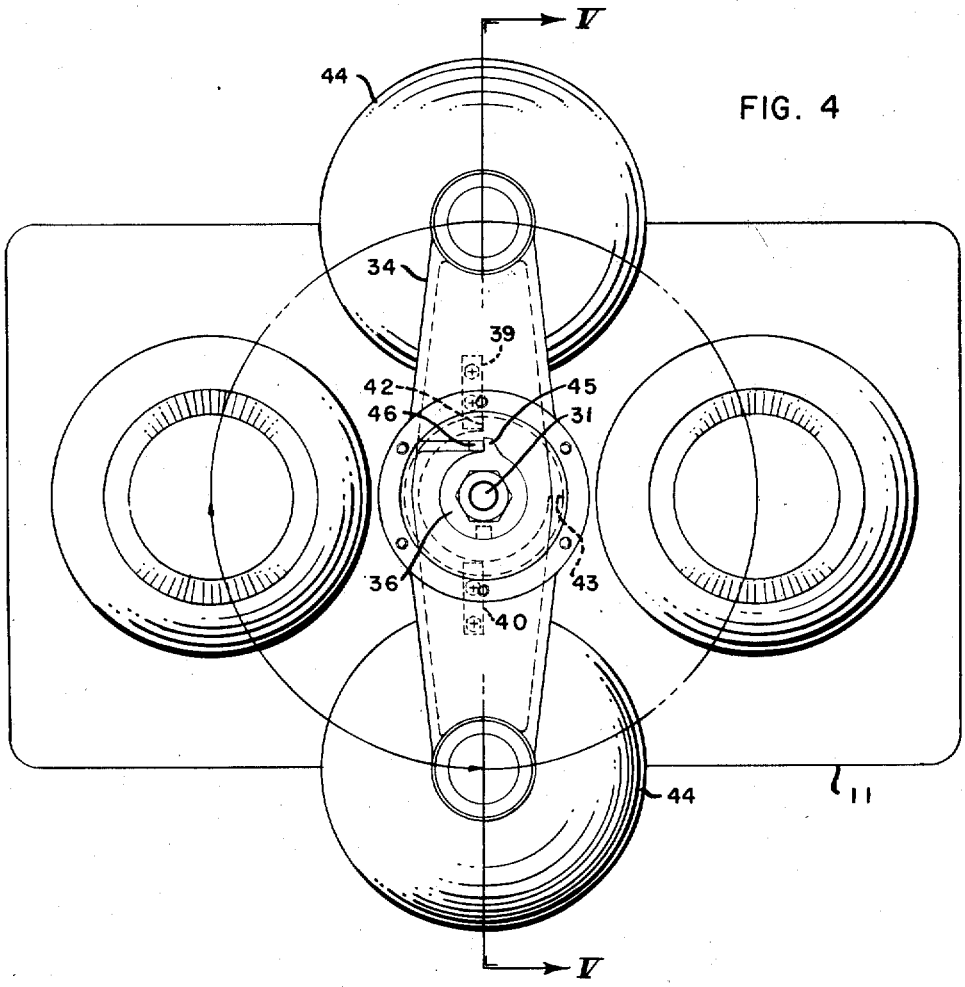
Figure 4 is an enlarged elevational view showing the means for closing an end of each of the flasks.

We provide means for closing the lower ends of the flasks when the flasks are in generally upright position, i.e., the chain line position of Figure 2, to hold finely divided mold forming material in the flasks when such material is introduced at the beginning of the cycle. Referring to Figures 1 to 5, inclusive, we mount for rotation in the cradle 11 substantially centrally thereof in bushings 30 a shaft 31. The cradle 11 carries a rotary cylinder 32 coaxial with the shaft 31 and coupled to the shaft 31 by a coupling 33 whereby the rotary cylinder 32 turns the shaft 31 in either direction upon appropriate application of fluid under pressure to the rotary cylinder. The axis of the shaft 31 is parallel to and equidistant from the axes of the flasks 16 and lies in the common plane of the axes of the flasks, as shown in Figure 4.

Figure 5:
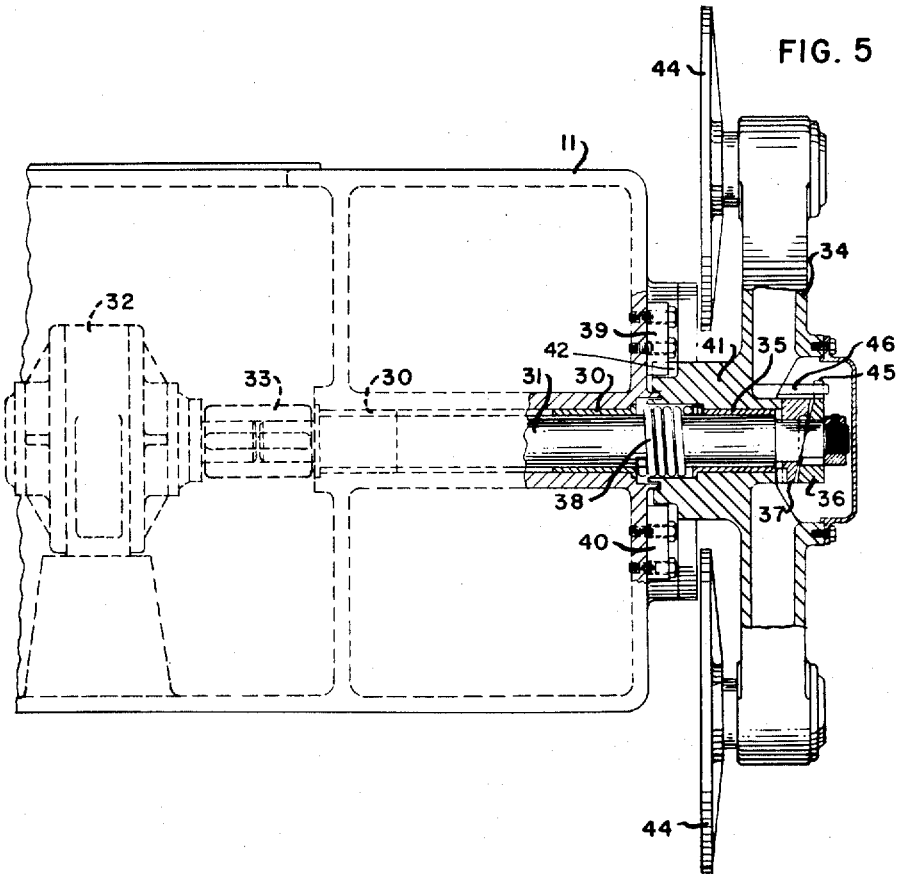
Figure 5 is a view partly in elevation and partly in vertical longitudinal cross section on the line V—V of Figure 4.

The shaft 31 has the end thereof opposite the end connected with the coupling 33 projecting from the cradle 11, and a spider 34 is mounted on the shaft for turning movement and also for axial movement relatively to the shaft, the spider 34 having a central bore receiving the shaft and a bushing 35 lining the central bore. Fxed to the extremity of the shaft so as in effect to form an integral part thereof is a cam 36 as shown in Figure 5. A complementary cam 37 is fixed to the spider 34. A coil spring 38 has one end connected with the shaft 31 and the other end connected with the spider 34 as shown in Figure 5. Fixedly mounted on the cradle 11 are stops 39 and 40. The spider 34 has a hub 41 having a portion thereof at its periphery cut away to form two shoulders 42 and 43. Viewing Figure 4, the spider 34, insofar as its turning movement is concerned, is movable only through an angle of 90° between the position in which it is shown in that figure and a position turned 90° clockwise therefrom. In Figure 4 the spider is shown in its extreme counterclockwise position with the shoulder 42 against the stop 39. When the spider turns clockwise 90° from that position the shoulder 43 engages the stop 40 and terminates the turning movement of the spider. The spider has opposed arms respectively carrying flask closure members 44, one for each flask. The closure members 44 are rotatably carried by the arms so that when they are applied to the flasks and the flasks are rotated the closure members will rotate with the flasks.

The cam 36 carried by the shaft 31 has a projection 45 adapted to cooperate with a projection 46 carried by the spider. The spring 38 at all times urges the projections 45 and 46 into contact with each other as shown in Figure 4 but resiliently permits the shaft 31 to be turned clockwise viewing Figure 4 relatively to the spider 34 after the shoulder 43 of the spider has engaged the stop 40. The effect of continued turning of the shaft 31 after the shoulder 43 of the spider has engaged the stop 40 is to turn the cam 36 relative to the cam 37 and thereby move the spider axially of the shaft 31 toward the left viewing Figures 1, 2 and 5 to apply the closure members 44 to the flasks.

The closure members 44 are shown in the drawings in their inoperative positions. When the closure members are to be applied to the flasks the rotary cylinder 32 is operated to turn the shaft 31 in the clockwise direction viewing Figure 4. Since the spring 38 tends at all times to maintain the projections 45 and 46 in contact with each other as shown in Figure 4, the shaft 31 and the spider 34 turn together until the shoulder 43 engages the stop 40. When the shoulder 43 engages the stop 40 the closure members 44 are respectively in coaxial alignment with the flasks. Continued turning thereafter of the shaft 31 in the clockwise direction viewing Figure 4 causes the projection 45 to move away from the projection 46, the cam 36 acting on the cam 37 to move the spider rectilinearly toward the cradle and apply the closure members 44 to the flasks 16. The spring 38 in addition to resiliently urging the projections 45 and 46 into contact with each other also tends to urge the spider 34 toward the right viewing Figure 5 and hence is effective for resiliently maintaining the cams 36 and 37 in engagement with each other at all times.

When the closure members 44 are to be moved from operative position closing the ends of the flasks to inoperative position the rotary cylinder 32 is operated to turn the shaft 31 in the counterclockwise direction viewing Figure 4. Initially the shaft only will turn until the projection 45 engages the projection 46. During such turning of the shaft only, while the spider 34 does not turn the spider moves rectilinearly outwardly or toward the right viewing Figure 5 to separate the closure members 44 from the flasks 16. By the time the projection 45 comes into contact with the projection 46 the closure members 44 will have parted contact with the flasks so that they may then be turned to positions offset from the flasks. Such turning of the closure members to positions offset from the flasks is accomplished by continued counterclockwise turning of the shaft 31 which through the engagement of the projection 45 with the projection 46 turns with it the spider 34 carrying the closure members 44. Such turning movement of the spider is continued until the shoulder 42 engages the stop 39 at which time the parts are in the position shown in the drawings with the closure members 44 in inoperative position.

Mounted on the respective supporting portions 3 in spaced apart coaxial relationship are rotary cylinders 47 having coaxial shafts 48 which are turned upon turning movement of the rotors of the rotary cylinders 47. Fastened to the opposed coaxial shafts 48 is a core holder carrier 49 of generally U shape as shown in Figure 1, the core holder carrier 49 being carried by the shafts 48 adjacent the extremities of the legs of the U. The core holder carrier 49 is adapted to be turned by operation of the rotary cylinders 47 between a position in which it is disposed in a generally vertical plane as indicated by chain lines in Figure 2 and a position in which it is disposed in a generally horizontal plane as shown in Figure 1; in other words, the core holder carrier is adapted to be turned about the common axis of the rotary cylinders 47 through an angle of approximately 90°. The operative position of the core holder carrier 49 is the generally horizontal position as shown in Figure 1 and in full lines in Figure 2. The core holder carrier is stopped accurately in operating position by a boss or bosses 50 carried by the base with which an integral positioning bracket or integral positioning brackets 51 carried by the core holder carrier coacts or coact.

The core holder carrier comprises two parallel cylinders 52 whose axes are spaced apart a distance equal to the spacing between the axes of the flasks 16. When the core holder carrier 49 is in operative position the cylinders 52 are respectively coaxial with the flasks. Within each cylinder 52 is mounted for axial movement by fluid under pressure a core holder 53 adapted to hold a core 53a to the applied to the corresponding flask. The core holder carrier 49, being of generally U shape as above described, has therein an opening or space designated 54 in Figure 1 through which the mandrels 25 may pass when the core holder carrier is in the generally upright position indicated by chain lines in Figure 2.

When the mandrels 25 are performing their function in the flasks and moving between their respective positions the core holder carrier is disposed in its generally upright position. When the core holder carrier is in its generally upright position the core holders 53 are adapted to have cores 53a applied thereto. When the mandrels are withdrawn from the flasks the core holder carrier is moved to operative position as shown in Figure 2 and the core holders 53 each with a core 53a thereon are moved toward the left viewing Figures 1 and 2 to apply the cores within the right-hand ends of the flasks 16 viewing those figures in preparation for casting. At that time, of course, the closure plates 44 are in their inoperative positions as shown in the drawings.

Figure 7:
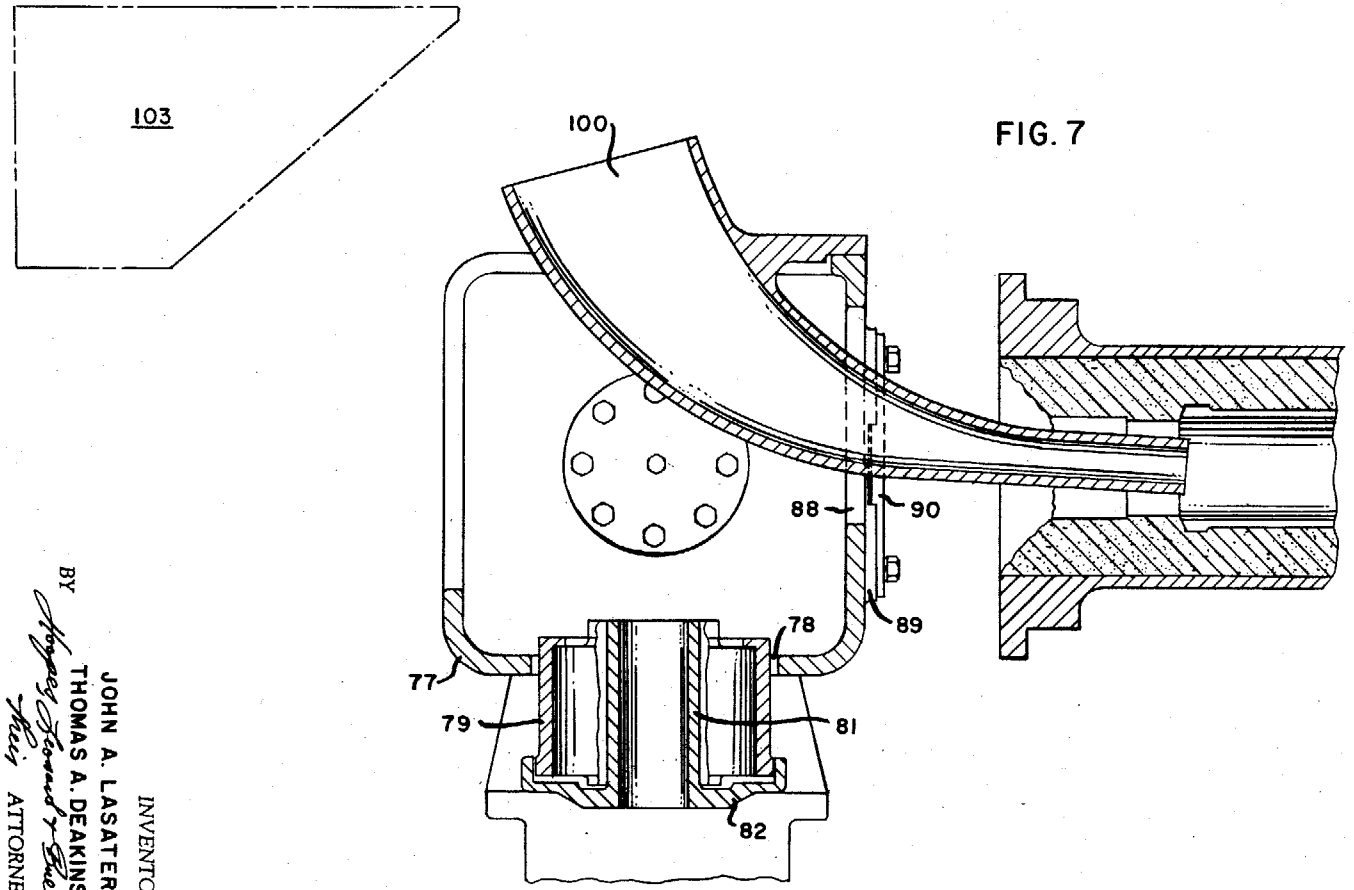
Figure 7 is a view similar to Figure 6 of the same elements of the apparatus but with the pouring spout in operative position and the support for the forward end of the mandrel in inoperative position.

Our apparatus is adaptable for forming either single hub or double hub pipe, requiring some modification when it is changed over from one to the other. Figures 6 and 7 show a mandrel support and a pouring spout employed when single hub pipe is being cast. The hub is formed at the right-hand end of each flask viewing Figures 1 and 2, the spigot being formed at the left-hand end, which is the end shown in Figures 6 and 7. Figures 6 and 7 show mechanism cooperating with one flask; it is to be understood that the mandrel support and pouring spout shown in Figures 6 and 7 are duplicated for each flask.

The forward end of each mandrel 25 is designed to selectively accommodate means for use when single hub pipe is being cast and means for use when double hub pipe is being cast, such means also being disclosed in copending application Serial No. 285,213, filed April 30, 1952, now abandoned. The forward end of each mandrel 25 has a reduced portion 55 forming with the body of the mandrel a shoulder 56. Beyond the reduced portion 55 is a further reduced portion 57. A sleeve is introduced over the portion 57 and the portion 55 so as to abut against the shoulder 56, the shape of the sleeve being determined by whether single hub pipe or double hub pipe is to be cast. In Figures 8 and 9 the sleeve is designated 58 and has an enlarged portion 59 whose extremity engages the shoulder 56 and which fits snugly about the portion 55 of the mandrel and a reduced portion 60 which fits snugly about the portion 57 of the mandrel. The outer surfaces of the portions 59 and 60 are cylindrical, the outer surface of the portion 59 being of the same diameter throughout as the outer surface of the body of the mandrel 25. The sleeve 58 is held in place on the mandrel by a cap 61 fitting snugly over the end of the portion 57 and maintained in place by a stud 62 threaded into the end of the mandrel and passing through a bore 63 in the head of the cap, a holding nut 64 being threaded onto the stud 62 and bearing against the end of the cap.

A sleeve 58 is used on each mandrel 25 when double hub pipe is being cast as will presently be explained. When single hub pipe is being cast each sleeve 58 is replaced by a sleeve 65 shown in Figure 6. The sleeves 65 differ from the sleeves 58 in that each sleeve 65 has an annular outward projection 66 at the left-hand extremity of the larger portion of the sleeve viewing Figure 6, the projection 66 being for the purpose of forming in the mold a depression for casting of the spigot at the end of a length of single hub pipe opposite the end at which the hub or bell of the pipe is disposed. Likewise the portion of the sleeve 65 to the left of the projection 66, viewing Figure 6, which portion is designated 67 is of smaller external diameter than the portion 60 of the sleeve 58. This is to insure formation in the mold of an adequate dam beyond the depression in which the pipe spigot is formed so that the molten material of which the pipe is being cast will not flow out of the end of the mold.

The base 2 carries adjacent the left-hand ends of the flasks viewing Figures 1 and 2 parallel rods 68 on which is mounted for movement generally parallel to the axes of the flasks when in generally horizontal position a carriage 69. The carriage 69 has downward projections 70 in each of which is mounted a bushing 71, the bushings riding in guided relationship upon the rods 68. Carried by the base 2 substantially at the longitudinal center line thereof is a cylinder 72 arranged with its axis generally horizontal and generally parallel to the length of the apparatus in which operates a piston whose piston rod 73 is connected to the carriage 69. Thus operation of the piston in the cylinder 72 causes movement of the carriage 69 along the rods 68. Movement of the carriage toward the right viewing Figure 1 is limited by a pair of adjustable stop screws 74 mounted on the base. Movement of the carriage 69 in the opposite direction is limited by the piston in the cylinder 72 reaching the end of its stroke.

The carriage 69 is of generally U shape in plan as shown in Figure 1. Mounted on the opposed portions of the carriage 69 as shown in Figure 1 in opposed spaced apart coaxial relationship are rotary cylinders 75 having coaxial shafts 76 which are turned upon turning movement of the rotors of the rotary cylinders 75. Fastened to the opposed coaxial shafts 76 is a carrier 77. By operation of the rotary cylinders 75 the carrier 77 may be turned between two positions approximately 90° apart, suitable stop means (not shown) being provided for stopping the carrier in each of those positions. In one of the positions means carried by the carrier for supporting the forward end of the mandrel are positioned in alignment with the mandrel and in the other position a pouring spout carried by the carrier is positioned with its outlet end generally in alignment with the axis of the flask. Figures 6 and 8 show the carrier in the first mentioned position for the formation of single hub and double hub pipe respectively and Figures 7 and 9 show the carrier in the second mentioned position for the formation of single hub and double hub pipe respectively.

The body of the carrier 77 is of generally hollow shape as shown in Figures 6, 7, 8 and 9. The wall of the carrier which is disposed toward the cradle 11 in the position in which the carrier is shown in Figures 6 and 8 has two circular openings 78 therein, such openings being respectively substantially coaxial with the flasks 16. Applied to the carrier 77 at each of the openings 78 is a bearing bracket 79. Each bearing bracket 79 is fastened to the carrier 77 by any suitable fastening means not shown and which may, for example, be as disclosed in copending application Serial No. 285,213. Disposed within each bearing bracket 79 is a bearing unit 80 of any suitable type, such, for example, as a Dodge bearing unit. Each bearing unit 80 may be maintained within its bearing bracket 79 by being pressed therein. Each bearing unit 80 has a generally cylindrical opening therethrough as known to those skilled in the art for receiving a rotatable machine part.

We provide for rotatably mounting in each of the bearing units 80 a part whose form is determined by whether the pipe being cast is single hub pipe or double hub pipe. For casting single hub pipe that part is in the form of a flanged sleeve 81 shown in Figure 6 serving as a pilot or mandrel support. The flange of the pilot is designated 82 and serves as a guard to prevent mold forming material from getting into the bearing unit. The bore of the pilot is dimensioned to snugly and guidingly receive the mandrel cap 61 as shown in Figure 6. The pilot supports the end of the mandrel while the mandrel is performing its mold forming function.

When double hub pipe is being cast the pilot 81 is replaced by a combination pilot and hub 83 as shown in Figure 8. The combination pilot and hub 83 may be formed in one piece as shown or in two pieces bolted or otherwise fastened together. The hub portion is designated 84 and projects axially from the pilot portion as shown in Figure 8. The hub 84 is adapted to be engaged by the forward portion of the mandrel when the mandrel is introduced into the flask and to lie within the flask to form an enlargement at the end of a mold of compacted mold forming material in the flask to form one of the hubs on the pipe being cast. The nose of the hub 84 is tapered as shown at 85 and has a bore 86 of such size as to snugly receive the portion 59 of the sleeve 58 as shown in Figure 8. The rearward portion of the hub 84 is hollowed and has passages 87 to permit mold forming material pushed into the hub by the end of the mandrel to be discharged centrifugally upon rotation of the mandrel and hub.

The axial distance from the end of the mandrel to the tapered shoulder between the portions and 59 and 60 of the sleeve 58 is greater than the axial distance between the extremity of the hub 84 and the mouth of the pilot. This is to insure that the mandrel will be in guided relationship to the pilot when the portion 59 of the sleeve 58 enters the hub 84 whereby to avoid damage to the hub.

The carrier 77 has two openings 88 disposed respectively with their centers approximately in the vertical longitudinal planes containing the axes of the flasks 16. Each of the openings 88 is flanked on both sides by pads 89 for the application of a core holder when double hub pipe is to be cast. When single hub pipe is to be cast no core holder is used and the pads 89 are covered and protected by cover plates 90. When double hub pipe is being cast a core holder 91 is rotatably mounted on the carrier 77 at each of the openings 88. Each of the core holders 91 has a mounting structure comprising two cylinders 92 which are spaced apart in parallel relationship as shown in Figure 1. Each of the cylinders 92 has a closed end 93 and an open end surrounded by a flange 94 which is bolted to the corresponding pads 89 whereby to fasten the cylinder in place on the carrier 77. Each of the cylinders 92 has therein a piston 95 having a very short stroke as shown in Figure 1, a piston rod 96 being connected with each piston 95 and projecting out of the open end of the cylinder and through an ear 97 projecting outwardly from a core holder mounting bracket 98 in which one of the core [holding] *holders* 91 is rotatably mounted in bearings 105. Nuts 99 are applied to the ends of the rods 96 as shown in Figure 1. Fluid pressure connections lead from a source of fluid under pressure such as compressed air to the closed ends of the cylinders 92 so that the small space between the closed end of each cylinder 92 and the piston 95 therein is under resilient compression. The purpose of thus mounting the core holders is to allow the core holders to yield slightly when cores carried thereby are introduced into the ends of the flasks into contact with molds formed in the flasks to inhibit possible damage to the cores and/or molds such as might occur if the core holders were rigidly mounted on the carrier.

Mounted on the carrier 77 are two pouring spouts 100, each positioned so that upon appropriate operation of the carrier 77 and the carriage 69 its outlet end may be introduced into the corresponding flask to deliver molten material for casting thereinto. The pouring spouts are mounted on the carrier so that when double hub pipe is to be cast the core holders 91 and the cores carried thereby are disposed about the outlet ends of the spouts.

Each core holder 91 is rotatably mounted within the corresponding core holder mounting bracket 98 so that when a core is held thereby in operative relation to a mold in the adjacent rotating flask the core while being continually supported by the core holder is free to turn with the mold and flask. The pouring spouts 100, of course, do not turn but remain in stationary position while discharging the molten material to be cast into the rotating molds.

We preferably dispose an annular mass of resilient material, such as rubber or the like, upon each of the core holders 91 so as to be interposed between the supporting or backing portion of the core holder and the core to compensate for possible slight lack of coaxial relationship between the core and the mold during casting as above explained. Such a mass of resilient material is shown at 101 in Figures 8 and 9. A core applied to a core holder 91 is shown at 102 in Figures 8 and 9. Suitable stop means (not shown) are provided for stopping the turning movement of the carrier 77 with the respective instrumentalities above described selectively disposed in coaxial relationship with the respective flasks. When an instrumentality to cooperate with a flask is in coaxial relationship with the flask it is brought into cooperative relationship with the flask by moving the carriage 69 toward the right viewing Figures 1 and 2 until its motion is stopped by the screws 74 as above described. The screws 74 are adjusted to stop the movement of the carriage when the instrumentalities carried thereby are in proper cooperative relationship with the flasks.

For each flask we provide a ladle adapted to pour molten material into the corresponding pouring spout 100 and thence into the flask. We have shown a ladle diagrammatically in chain lines at 103 in each of Figures 6, 7, 8 and 9. In Figure 2 the ladle 103 is shown in full lines in its position prior to pouring and in chain lines in its position upon completion of the pour. The ladle diagrammatically shown in the drawing is a tilting type ladle although a bottom pour ladle may be used if desired. In any event, each ladle 103 is mounted at a fixed location and does not have to be bodily shifted toward and away from the corresponding flask. A tilting type ladle need partake only of tilting movement to discharge its contents. A ladle of the bottom pour type need not partake of any movement.

We shall now describe a present preferred method of casting single hub pipe by use of our apparatus. At the end of a cycle the flasks are in generally upright position and are open top and bottom since the pipes cast during that cycle have been discharged downwardly therefrom. The molds and cores have likewise been so discharged. The first step is to move the closure members 44 to operative portion to close the lower ends of the flasks. When the lower ends of the flasks have been closed finely divided mold forming material is introduced downwardly into the flasks. The flasks may be used to measure the quantity of finely divided mold forming material introduced as disclosed in United States Letters Patent No. 2,598,554. As soon as the finely divided mold forming material has been introduced into the flasks rotation of the flasks is commenced and at the same time the cradle support is turned about the axes of the rotary cylinders 5 until the cradle is in a position in which the axes of the flasks are substantially horizontal. The rotation of the flasks centrifuges the mold forming material so that an opening is formed in the mold forming material in each flask extending generally axially of the flask. About the time the flasks reach horizontal position the closure members 44 are moved to inoperative position to uncover the right-hand ends of the flasks viewing Figures 1 and 2. At that time the core holder carrier 49 is positioned with the core holders generally upright as shown in chain lines in Figure 2 so that the opening 54 is in the path of movement of the mandrels 25 as above explained. The mandrels 25 are moved from right to left viewing Figures 1 and 2 to introduce the mandrels into the flasks through the openings in the finely divided mold forming material formed by the initial centrifuging of the mold forming material above described. At the same time the carriage 69 with the carrier 77 oriented as shown in Figure 6 is advanced from left to right viewing Figures 1 and 2. Thus the mandrels and the pilots for the leading ends of the mandrels move into cooperative relationship as shown in Figure 6.

When the mandrels are supported in coaxial relationship with the flasks with the leading end of each mandrel disposed in the corresponding pilot as shown in Figure 6, and while rotation of the flasks continues, the cradle 11 is turned through a small angle in the counterclockwise direction about the axis of the pivot pin 8 viewing Figure 3 by admitting fluid above the left-hand pistons 15 as above described, the extent of such movement of the cradle 11 being as has been stated determined by the right-hand pistons 15 reaching the upper ends of their strokes in the corresponding cylinders 14. By such movement of the cradle the flasks and mandrels are relatively offset whereby the mandrels consolidate and smooth the mold forming material in the flasks. The mandrels are shaped as shown in the lower portion of Figure 1 to form at the right-hand end of each mold an enlargement for receiving a core and to form at the left-hand end of each mold a depression for forming a spigot when the molten material is cast. The mandrel shape is not new.

After the mold forming material has thus been acted upon by the mandrels and the molds have been completely formed within the flasks the cradle 11 is moved back to its original position as shown in Figure 3 by admitting fluid under pressure above the right-hand pistons 15. When the cradle and flasks reach their original position as shown in Figure 3 the mandrels are withdrawn toward the right viewing Figures 1 and 2 to their inoperative position as shown in those figures and at the same time the carriage 69 is moved to the left. The carrier 77 is turned from the orientation shown in Figure 6 to that shown in Figure 7 whereupon the carriage 69 is again moved to the right until it is stopped by the screws 74. Meanwhile the core holder carrier 49 is moved from the upright position indicated in chain lines in Figure 2 to the operative position shown in full lines in Figures 1 and 2 whereupon the core holders 53 each with a core 53a thereon are moved toward the left to position the cores in cooperative relationship with the molds in the flasks. The pouring spouts 100 having reached operative position with their outlet ends within the molds as shown in Figure 7, the ladles 103 are caused to discharge their contents into the respective pouring spouts which deliver the molten material into the rotating molds. The molten material thus delivered into the rotating molds is centrifuged therein to form lengths of single hub pipe. Rotation of the flasks is continued until the molten material has solidified sufficiently to retain its shape. The core holders 53 are removed from the flasks and tilted to the chain line position of Figure 2 and the pouring spouts 100 are removed from the flasks, whereupon the flasks are turned to upright position and the cast lengths of pipe are discharged downwardly therefrom. Gravity may be sufficient to cause the cast pipe lengths to be discharged downwardly from the molds, but in any event we prefer to provide means known to those skilled in the art and not shown in the drawings to forcibly eject the pipe lengths if necessary.

The cycle of operations is the same when double hub pipe is being formed except that when the mandrels are introduced into the flasks to consolidate and smooth the mold forming material therein to form the molds the hubs 84 shown in Figure 8 are employed to form at the left-hand end of each flask viewing Figures 1 and 2 as well as at the right-hand end a core receiving enlargement. Also, when double hub pipe is to be formed the introduction of the pouring spout into the end of each mold is accompanied by simultaneous introduction of the corresponding core holder 91 with a core 102 thereon as shown in Figure 9. When the cores 102 are introduced the resilient mounting of the core holders 91 carrying them inhibits damage to the cores or the molds when the cores seat in the molds. The seating of the cores in the molds is along complementary shoulders indicated at 104 in Figure 9.

Thus we obtain advantages in efficiency and economy of operation and produce a superior product.

While we have shown and described a present preferred embodiment of the invention and have illustrated a present preferred method of practicing the same it is to be distinctly understood that the invention is not limited thereto but may be otherwise variously embodied and practiced within the scope of the following claims.

We claim:

1. Centrifugal casting apparatus comprising a rotatable open-ended mold, a carriage movable generally axially of the mold adjacent an open end thereof, a core holder and mounting means mounting the core holder on the carriage for movement into and out of cooperative relationship with the mold upon movement of the carriage generally axially of the mold, the mounting means including cushioning means operatively interposed between the core holder and the carriage to permit slight relative movement between the core holder and the carriage when a core carried by the core holder comes into engagement with a portion of the mold whereby to minimize the likelihood of damage to the core or mold when applying a core to the mold.

2. Centrifugal casting apparatus comprising a rotatable open-ended mold, a carriage movable generally axially of the mold adjacent an open end thereof, a core holder, mounting means mounting the core holder on the carriage for movement into and out of cooperative relationship with the mold upon movement of the carriage generally axially of the mold and for rotation about an axis generally coincident with the axis of rotation of the mold, the mounting means including cushioning means operatively interposed between the core holder and the carriage to permit slight relative movement between the core holder and the carriage when a core carried by the core holder comes into engagement with a portion of the mold and resilient means mounted upon the core holder disposed so as to be interposed between the core holder and a core when a core is applied to the core holder, said resilient means being adapted to yield to compensate for any slight lack of coincidence between the axis of rotation of the mold and the axis of rotation of the core holder to insure proper cooperative relationship between the core and the mold during rotation.

[3. Centrifugal casting apparatus comprising a rotatable open-ended mold, a carriage movable generally axially of the mold adjacent an open end thereof, a core holder mounted on the carriage so as to position a core held thereby to extend within the open end of the mold when the carriage is in position with the core holder in cooperative relationship with the mold and a pouring spout mounted on the carriage with its outlet extending within the core holder.]

[4. Centrifugal casting apparatus comprising a rotatable open-ended mold, a carriage movable generally axially of the mold adjacent an open end thereof, a core holder rotatably mounted on the carriage so as to rotatably position a core held thereby to extend within the open end of the mold when the carriage is in position with the core holder in cooperative relationship with the mold and a pouring spout mounted in fixed position on the carriage with its outlet extending within the rotatably mounted core holder.]

5. Centrifugal casting apparatus comprising a cradle support, a cradle carried by the cradle support for limited turning movement relatively to the cradle support, an open-ended flask adapted to receive finely divided mold forming material rotatably mounted in the cradle, means for rotating the flask, a mandrel and a guide for the mandrel along which the mandrel is movable into the flask when the cradle is in a predetermined position in the cradle support, the mandrel when within the flask being effective during rotation of the flask to consolidate finely divided mold forming material therein to form a mold upon limited turning of the cradle in the cradle support.

6. Centrifugal casting apparatus comprising a cradle support, a cradle carried by the cradle support for limited turning movement relatively to the cradle support, an open-ended flask adapted to receive finely divided mold forming material rotatably mounted in the cradle, means for rotating the flask, a mandrel, a guide for the mandrel along which the mandrel is movable into the flask when the cradle is in a predetermined position in the cradle support, the mandrel when within the flask being effective during rotation of the flask to consolidate finely divided mold forming material therein to form a mold upon limited turning of the cradle in the cradle support, means acting between the cradle and the cradle support for turning the cradle relatively to the cradle support and stop means for limiting the turning movement of the cradle relatively to the cradle support.

7. Centrifugal casting apparatus comprising a cradle support, a cradle carried by the cradle support for limited turning movement relatively to the cradle support, a plurality of generally parallel open-ended flasks each adapted to receive finely divided mold forming material rotatably mounted in the cradle, means carried by the cradle for rotating the flasks, a plurality of generally parallel mandrels, guide means for the mandrels along which the mandrels are movable into the respective flasks when the cradle is in a predetermined position in the cradle support, the mandrels when within the flasks being effective during rotation of the flasks to consolidate finely divided mold forming material therein to form molds upon limited turning of the cradle in the cradle support.

8. Centrifugal casting apparatus comprising a cradle support, a cradle carried by the cradle support for limited turning movement about an axis relatively to the cradle support, a plurality of generally parallel open-ended flasks having their respective axes substantially equidistant from the first mentioned axis each adapted to receive finely divided mold forming material rotatably mounted in the cradle, means carried by the cradle for rotating the flasks, a plurality of generally parallel mandrels, guide means for the mandrels along which the mandrels are movable into the respective flasks when the cradle is in a predetermined position in the cradle support, the mandrels when within the flasks being substantially equally effective during rotation of the flasks to consolidate finely divided mold forming material therein to form molds upon limited turning of the cradle in the cradle support.

9. Centrifugal casting apparatus comprising a cradle support, a cradle carried by the cradle support for limited turning movement relatively to the cradle support, an open-ended flask adapted to receive finely divided mold forming material rotatably mounted in the cradle, means for rotating the flask, a base upon which the cradle support is mounted for turning movement between a position in which the axis of the flask is generally upright and a position in which the axis of the flask is generally horizontal, a mandrel and a guide for the mandrel along which the mandrel is movable into the flask when the axis of the flask is generally horizontal and the cradle is in a predetermined position in the cradle support, the mandrel when within the flask being effective during rotation of the flask to consolidate finely divided mold forming material therein to form a mold upon limited turning of the cradle in the cradle support.

10. Centrifugal casting apparatus comprising a base, a cradle support mounted on the base for turning movement about a generally horizontal axis, means for turning the cradle support about that axis, a cradle pivotally carried by the cradle support, a plurality of generally parallel open-ended flasks each adapted to receive finely divided mold forming material rotatably mounted in the cradle, means for rotating the flasks, a plurality of generally parallel mandrels mounted for movement to enter the respective flasks when the cradle support is in a predetermined position relatively to the base and the cradle is in a predetermined position relatively to the cradle support and means for turning the cradle about its pivotal connection with the cradle support when the mandrels are within the flasks and the flasks with finely divided mold forming material therein are rotating to consolidate the finely divided mold forming material to form molds in the flasks.

[11. Centrifugal casting apparatus comprising a base, a cradle, a plurality of generally parallel open-ended flasks rotatably mounted in the cradle, means for rotating the flasks, the cradle being mounted on the base for turning movement between a position in which the axes of the flasks are generally upright and a position in which the axes of the flasks are generally horizontal, a spider carrying a plurality of closure members, one for each flask, having an operative position with the closure members closing an end of each flask, means moving the spider to dispose the closure members in inoperative position removed from the ends of the flasks and core holders for holding cores in position at said ends of the flasks when the flasks are in position with their axes generally horizontal, the core holders being separate from the closure members. ]

[12. Centrifugal casting apparatus comprising a cradle, a plurality of generally parallel open-ended flasks rotatably mounted in the cradle, means for rotating the flasks, a spider carrying a plurality of rotatable closure members, one for each flask, having an operative position with the closure members closing an end of each flask, and means turning the spider and also moving it away from the ends of the flasks to dispose the closure members in inoperative position axially removed from the ends of the flasks and offset from the flasks and core holders for holding cores in position at said ends of the flasks when the flasks are in position with their axes generally horizontal, the core holders being separate from the closure members.]

13. Centrifugal casting apparatus comprising a cradle support, a cradle carried by the cradle support for limited turning movement relatively to the cradle support, an open-ended flask adapted to receive finely divided mold forming material rotatably mounted in the cradle, means for rotating the flask, closure means carried by the cradle for movement between operative position closing the open end of the flask and inoperative position removed from the open end of the flask, a mandrel and a guide for the mandrel along which the mandrel is movable into the flask when the cradle is in a predetermined position in the cradle support and the closure means is in inoperative position, the mandrel when within the flask being effective during rotation of the flask to consolidate finely divided mold forming material therein to form a mold upon limited turning of the cradle in the cradle support.

14. Centrifugal casting apparatus comprising a cradle support, a cradle carried by the cradle support for limited turning movement relatively to the cradle support, a plurality of generally parallel open-ended flasks each adapted to receive finely divided mold forming material rotatably mounted in the cradle, means carried by the cradle for rotating the flasks, closure means carried by the cradle for movement between operative position closing the open ends of the flasks and inoperative position removed from the open ends of the flasks, a plurality of generally parallel mandrels and guide means for the mandrels along which the mandrels are movable into the respective flasks when the cradle is in a predetermined position in the cradle support and the closure means is in inoperative position, the mandrels when within the flasks being effective during rotation of the flasks to consolidate finely divided mold forming material therein to form molds upon limited turning of the cradle in the cradle support.

15. Centrifugal casting apparatus comprising a cradle, an open-ended flask rotatably mounted in the cradle, means for rotating the flask, a shaft rotatably mounted in the cradle about an axis generally parallel with the axis of the flask, means for rotating the shaft, a closure member for the open end of the flask carried by the shaft and movable from a position transversely offset from the flask to a position in alignment with the flask upon turning of the shaft, means for stopping movement of the closure member when it reaches said position in alignment with the flask and connections between the closure member and the shaft effective upon continued turning of the shaft after the closure member has reached said position in alignment with the flask to move the closure member generally axially of the flask into position closing the open end thereof.

16. Centrifugal casting apparatus comprising a cradle, an open-ended flask rotatably mounted in the cradle, means for rotating the flask, a shaft rotatably mounted in the cradle about an axis generally parallel with the axis of the flask, means for rotating the shaft, a closure member for the open end of the flask carried by the shaft and movable from a position transversely offset from the flask to a position in alignment with the flask upon turning of the shaft, means for stopping movement of the closure member when it reaches said position in alignment with the flask, cam means connected with one of the closure member and shaft, and means connected with the other thereof engaging the cam means effective upon continued turning of the shaft after the closure member has reached said position in alignment with the flask to move the closure member generally axially of the flask into position closing the open end thereof.

17. Centrifugal casting apparatus comprising a cradle, an open-ended flask rotatably mounted in the cradle, means for rotating the flask, a shaft rotatably mounted in the cradle about an axis generally parallel with the axis of the flask, means for rotating the shaft, a closure member for the open end of the flask carried by the shaft and movable from a position transversely offset from the flask to a position in alignment with the flask upon turning of the shaft, means for stopping movement of the closure member when it reaches said position in alignment with the flask, cam means connected with one of the closure member and shaft, means connected with the other thereof engaging the cam means effective upon continued turning of the shaft after the closure member has reached said position in alignment with the flask to move the closure member generally axially of the flask into position closing the open end thereof and resilient means connected between the shaft and the closure member resisting said continued turning movement of the shaft after the closure member has reached said position in alignment with the flask and maintaining the cam means and the means engaging the cam means in engagement so that with the closure member closing the open end of the flask turning of the shaft in the reverse direction will cause an initial movement of the closure member generally axially away from the flask followed by movement of the closure member to said position transversely offset from the flask.

18. Centrigual casting apparatus comprising a base, a cradle, an open-ended flask adapted to receive finely divided mold forming material rotatably mounted in the cradle, means for rotating the flask, the cradle being mounted on the base for turning movement between a position in which the axis of the flask is generally upright and a position in which the axis of the flask is generally horizontal, a core holder carrier mounted on the base separately from the cradle for turning movement in a generally vertical plane between a position substantially coaxial with the flask adjacent an open end of the flask when the flask is disposed with its axis generally horizontal and a position with the axis of the core holder carrier generally upright, a core holder carried by the core holder carrier, means moving the core holder into cooperative relationship with the flask when the core holder carrier is in the first mentioned position and the flask is disposed with its axis generally horizontal, the core holder carrier having an opening therein positioned when the core holder carrier is disposed with its axis generally upright to permit passage therethrough of the mandrel hereinafter referred to, a mandrel, a guide for the mandrel along which the mandrel is movable through said opening and into the flask when the flask is disposed with its axis generally horizontal and means for relatively transversely moving the mandrel and flask when the mandrel is within the flask and the flask is rotating to consolidate finely dividing mold forming material in the flask to form a mold.

19. Centrifugal casting apparatus comprising a base, a cradle, an open-ended flask adapted to receive finely divided mold forming material rotatably mounted in the cradle, means for rotating the flask, the cradle being mounted on the base for turning movement between a position in which the axis of the flask is generally upright and a position in which the axis of the flask is generally horizontal, closure means carried by the cradle for movement between operative position closing the open end of the flask and inoperative position transversely offset from the open end of the flask, a core holder carrier mounted on the base separately from the cradle for turning movement in a generally vertical plane between a position substantially coaxial with the flask adjacent an open end of the flask when the flask is disposed with its axis generally horizontal and a position with the axis of the core holder carrier generally upright, a core holder carried by the core holder carrier, means moving the core holder into cooperative relationship with the flask when the core holder carrier is in the first mentioned position and the flask is disposed with its axis generally horizontal and the closure means is in inoperative position, the core holder carrier having an opening therein positioned when the core holder carrier is disposed with its axis generally upright to permit passage therethrough of the mandrel hereinafter referred to, a mandrel, a guide for the mandrel along which the mandrel is movable through said opening and into the flask when the flask is disposed with its axis generally horizontal and means for relatively transversely moving the mandrel and flask when the mandrel is within the flask and the flask is rotating to consolidate finely divided mold forming material in the flask to form a mold.

20. Centrifugal casting apparatus comprising a rotatably mounted flask, means for rotating the flask, a mandrel introducible through the flask for compacting finely divided mold forming material in the flask, a mounting member disposed adjacent the end of the flask opposite the end through which the mandrel is introduced, a support for the forward end of the mandrel and a pouring spout mounted on the mounting member and means for operating the mounting member to present selectively to the second mentioned end of the flask the support and the pouring spout.

21. Centrifugal casting apparatus comprising a rotatably mounted flask, means for rotating the flask, a mandrel introducible through the flask for compacting finely divided mold forming material in the flask, a molten material ladle mounted in a fixed location adjacent the end of the flask opposite the end through which the mandrel is introduced and adapted to pour out its contents for delivery into the flask, a mounting member disposed adjacent the end of the flask opposite the end through which the mandrel is introduced, a support for the forward end of the mandrel mounted on the mounting member, a core holder and pouring spout combination mounted on the mounting member and means for operating the mounting member to selectively move the support into position to support the forward end of the mandrel and move the core holder and pouring spout combination into a position in which the core holder applies a core carried thereby to the end of the flask opposite the end through which the mandrel is introduced and the pouring spout receives the contents of the ladle and delivers them into the flask.

[22. A centrifugal casting process comprising mounting for rotation about its axis an elongated peripherally closed open-ended mold having an enlargement therein adjacent an open end thereof, introducing simultaneously into said open end of the mold a hollow core and the outlet of a pouring spout, rotating the mold and core about the pouring spout and during such rotation introducing through the pouring spout through the core into the mold molten material to be centrifugally cast therein.]

[23. A centrifugal casting process comprising mounting for rotation about its axis an elongated peripherally closed mold open at both ends and having an enlargement therein adjacent each end, introducing a core into one of the open ends of the mold, introducing simultaneously into the other open end of the mold a hollow core and the outlet of a pouring spout, rotating the mold and cores and during such rotation introducing through the pouring spout through the hollow core into the mold molten material to be centrifugally cast therein.]

24. A method of making a mold of finely divided mold forming material in an open-ended flask comprising disposing the flask in generally upright position with its bottom closed, introducing into the flask through its upper end finely divided mold forming material, rotating the flask to centrifuge the finely divided mold forming material and form an opening therethrough generally along the axis of the flask and turning the flask to generally horizontal position and unclosing the bottom of the flask, introducing a mandrel into the opening and maintaining the mandrel in position about a substantially fixed axis and angularly offsetting the flask relatively to the mandrel to consolidate the finely divided mold forming material in the flask to form a mold.

25. Centrifugal casting apparatus comprising a rotatable mold comprising a rotatable body portion and a rotatable end portion cooperating with the body portion at an end thereof to form an end of a casting centrifugally cast in the mold, the end portion having a central opening therethrough, a carriage movable generally axially of the mold adjacent said end thereof, a carrier mounted on the carriage, [for shifting movement relatively to the carriage,] the rotatable end portion of the mold being mounted on the carrier, *the carrier being shiftable relatively to the carriage between a position in which the end portion is coaxial with the body portion of the mold and a position in which the end portion is non-coaxial with the body portion of the mold* and a pouring spout through which molten material to be cast is adapted to be introduced into the mold, the pouring spout being mounted on the carrier so as to deliver molten material into the mold when the carrier is in *said first mentioned* position *and* with the outlet of the pouring spout disposed approximately in the mold axis and the carriage is in position with the pouring spout disposed in cooperative relationship with the mold, the outlet of the pouring spout projecting through the opening in the end portion of the mold so as to permit rotation of the mold with the pouring spout out of contact therewith while the pouring spout remains stationary.

References Cited in the file of this patent or the original patent

UNITED STATES PATENTS

| | | |
|---|---|---|
| 1,567,488 | Burchartz | Dec. 29, 1925 |
| 1,615,877 | Knocke | Feb. 1, 1927 |
| 1,735,969 | Hurst et al. | Nov. 19, 1929 |
| 1,794,527 | Mathieu | Mar. 3, 1931 |
| 1,942,919 | Eurich et al. | Jan. 9, 1934 |
| 1,959,227 | Barr et al. | May 15, 1934 |
| 2,449,900 | Johnston | Sept. 21, 1948 |
| 2,480,284 | Boucher | Aug. 30, 1949 |
| 2,563,844 | Johnston | Aug. 14, 1951 |
| 2,598,554 | Johnston | May 27, 1952 |
| 2,613,410 | Johnston | Oct. 14, 1952 |
| 2,631,342 | Romine | Mar. 17, 1953 |
| 2,663,058 | Lentz et al. | Dec. 22, 1953 |
| 2,729,865 | Kaveny | Jan. 10, 1956 |

FOREIGN PATENTS

| | | |
|---|---|---|
| 688,270 | France | May 12, 1930 |
| 590,287 | France | Mar. 13, 1925 |